(12) United States Patent
Ricci

(10) Patent No.: US 6,901,828 B2
(45) Date of Patent: Jun. 7, 2005

(54) JOURNAL TURNING LATHE HAVING DUAL FEED SCREW DRIVE

(76) Inventor: Donato L. Ricci, W8477 - 162$^{nd}$ Ave., Hager City, WI (US) 54017

( * ) Notice: Subject to any disclaimer, the term of this patent is extended or adjusted under 35 U.S.C. 154(b) by 139 days.

(21) Appl. No.: 10/625,781

(22) Filed: Jul. 23, 2003

(65) Prior Publication Data

US 2005/0016339 A1 Jan. 27, 2005

(51) Int. Cl.$^7$ ............................................... B23B 5/14
(52) U.S. Cl. .............................. 82/113; 82/128; 82/130; 82/141
(58) Field of Search ........................... 82/113, 128, 130, 82/131, 132, 141; 83/508.2, 508.3

(56) References Cited

U.S. PATENT DOCUMENTS

| | | | | |
|---|---|---|---|---|
| 2,706,912 A | * | 4/1955 | Baker | 74/58 |
| 4,359,917 A | * | 11/1982 | Wilger et al. | 82/128 |
| 4,922,772 A | * | 5/1990 | Silk | 82/128 |
| 5,056,389 A | * | 10/1991 | Johnstead | 82/128 |
| 6,065,378 A | * | 5/2000 | Ricci | 82/128 |
| 6,553,875 B1 | * | 4/2003 | Miyano | 82/117 |

* cited by examiner

*Primary Examiner*—Willmon Fridie, Jr.
(74) *Attorney, Agent, or Firm*—Thomas J. Nikolai; Nikolai & Mersereau, P.A.

(57) ABSTRACT

A portable journal turning lathe for machining a shaft at a job site, including a pair of clamping rings that are adapted to be centered at spaced apart locations along the length of the shaft to be machined. Extending between the clamping rings is a plurality of guide shafts which slidingly support a split ring clamshell assembly. A cutting tool carrier is affixed to the rotatable ring portion of the clamshell assembly so that when the movable ring is driven the tool carrier orbits the shaft being machined. A plurality of feed screws driven by a servomotor translates the clamshell assembly along the guide shafts.

13 Claims, 3 Drawing Sheets

JOURNAL TURNING LATHE HAVING DUAL FEED SCREW DRIVE

BACKGROUND OF THE INVENTION

I. Field of the Invention

This invention relates generally to apparatus for repairing and refurbishing the bearing surfaces of rotating shafts of large machines at a job site, and more particularly to a portable journal turning lathe that can easily be transported to a location in the field where a machine is to be repaired, mounted in place on the machine's shaft to be turned and then operated to remove any scoring and other surface irregularities from the shaft so that it is ready for replacement of its bearings.

II. Background of the Invention

In my earlier U.S. Pat. No. 6,065,378 I describe a portable journal turning lathe including a pair of clamping rings that are adapted to be centered at spaced-apart locations along a length of a shaft to be refurbished. Extending between the clamping rings is a plurality of guide shafts which slidingly support a split-ring clamshell assembly. A cutting tool carrier is affixed to the rotatable ring portion of the clamshell assembly such that when the movable ring is driven, the tool carrier orbits the shaft being refurbished. A single feed screw driven by a servomotor translates the clamshell assembly along the guide shaft.

In the earlier arrangement described in my '378 patent, only a single feed screw was used to move the clamshell assembly along the guide shafts. As such, the lathe described in my '378 patent had some tolerance problems when doing large shafts. When the cutting tool would dig into the shaft to be machined it would create resistance on the longitudinal movement of the clamshell assembly on the guide shafts. The side opposite the feed screw lags behind so that the cut of the cutting assembly was not square and concentric to the shaft being machined.

The journal turning lathe of the present invention obviates this drawback. Rather than having a single feed screw, my present invention employs two feed screws which are positioned and simultaneously driven so as to hold the clamshell carrying the cutting tool square and concentric to the cylindrical workpiece being machined. In the case of the present invention compared to my earlier arrangement, the workpiece is more effectively machined.

SUMMARY OF THE INVENTION

The foregoing features and advantages of the present invention are achieved by providing a portable lathe for turning a shaft that comprises first and second clamping rings adapted to be centered at spaced-apart locations along the length of the shaft or pipe to be turned. Supported by the first and second clamping rings are pluralities of elongated, cylindrical guide shafts. A clamshell assembly is slidingly supported on the plurality of guide shafts, the clamshell assembly being of the type including a stationary ring member and a movable ring member journaled for rotation relative to the stationary ring member. A cutting tool carrier is mounted on the movable ring member of the clamshell assembly for supporting a cutting tool. A first drive means includes a pair of diametrically positioned and simultaneously, synchronously driven lead screws for translating the clamshell assembly along the guide shafts and a second drive means is mounted on the stationary ring member and that rotates the movable ring member carrying the tool carrier in a circular orbit about the workpiece.

The first and second clamping rings each include a plurality of threaded radial bores extending through them and threadingly fitted into these is a corresponding plurality of adjustable shaft-centering screws which can be readily adjusted for rending a clamshell assembly concentric with the access of the shaft to be turned at the time of setup.

The foregoing features, objects and advantages of the invention will become apparent to those skilled in the art from the following detailed description of a preferred embodiment, especially when considered in conjunction with the accompanying drawings in which like numerals in the several view refer to corresponding parts.

DESCRIPTION OF THE PREFERRED EMBODIMENT

Figure 1:
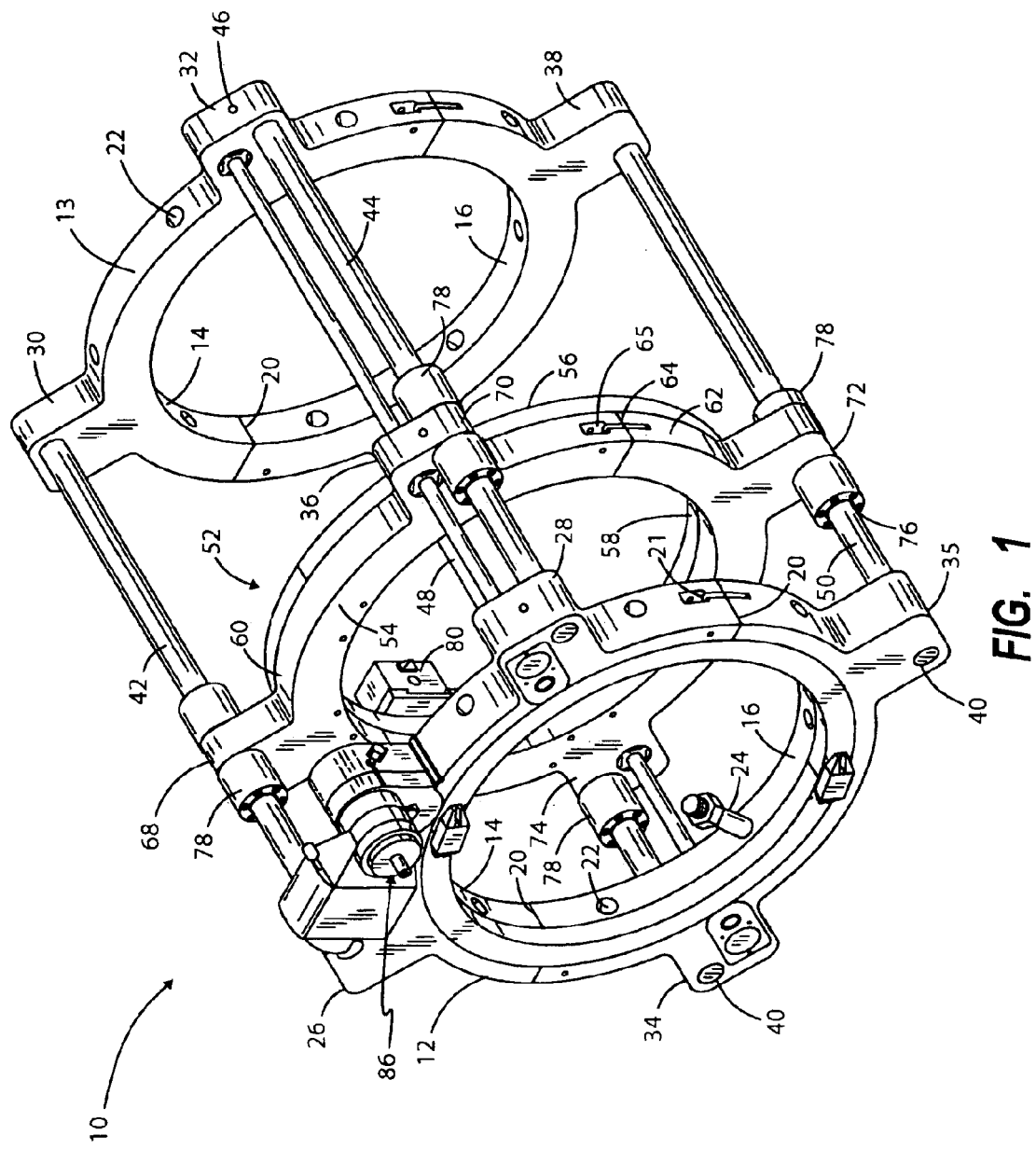
FIG. 1 is a perspective view of the portable journal turning lathe comprising a preferred embodiment of the present invention.

Referring first to FIG. 1, there is indicated generally by 10 a portable journal turning lathe constructed in accordance with the present invention. It is adapted to be mounted on a shaft or pipe (not shown) whose surface is in need of machining. The journal turning lathe 10 is seen to comprise a first and second clamping rings 12 and 13 having an inside diameter large enough to surround the workpiece to be machined. Clamping ring 12 and clamping ring 13 have substantially the same shape and size. Each includes semi-circular segments 14 and 16 which can be releasably fastened together along a parting line 20 by swing bolts 21 to form an annulus.

Threaded bores 22 are radially formed through the thickness dimension of the clamping rings. A plurality of centering bolts 24 are threadedly fitted into the threaded bores 22. The centering bolts 24 are moved in and out of the threaded bores 22 in a radial direction to accommodate a range of workpiece sizes that are to be machined.

Integrally formed to clamping ring segment 14 of clamping ring 12 are a pair of ring guides 26 and 28. Likewise, integrally formed in semi-circular segment 14 of clamping ring 13 are ring guides 30 and 32. Ring guides 34 and 35 are each integrally formed in semi-circular segment 16 of clamping ring 12. Ring guides 36 and 38 are also integrally formed in semi-circular ring segment 16 of clamping ring 13. The ring guides 36, 38, 30, 32, 34, 36 and 38 each include a longitudinally extending bore as at 40. Fitted into longitudinal bore 40 of ring guides 26 and 30 is a first guide shaft 42 comprising a smooth, cylindrical steel rod. An identical guide shaft 44 extends between ring guides 28 and 32. Set screws, at as 46, secure guides shafts 42 and 44 in their respective bores 40. Guide shaft 48 extends between ring guide 34 and ring guide 36. Setscrews 46 secure guide shaft 48 into the longitudinally extending bore 40 of ring guides 34 and 36. A final guide shaft 50 extends between ring guides 35 and 38, and setscrews 46 secure guide shaft 50 into the longitudinally extending bore 40.

Figure 3:
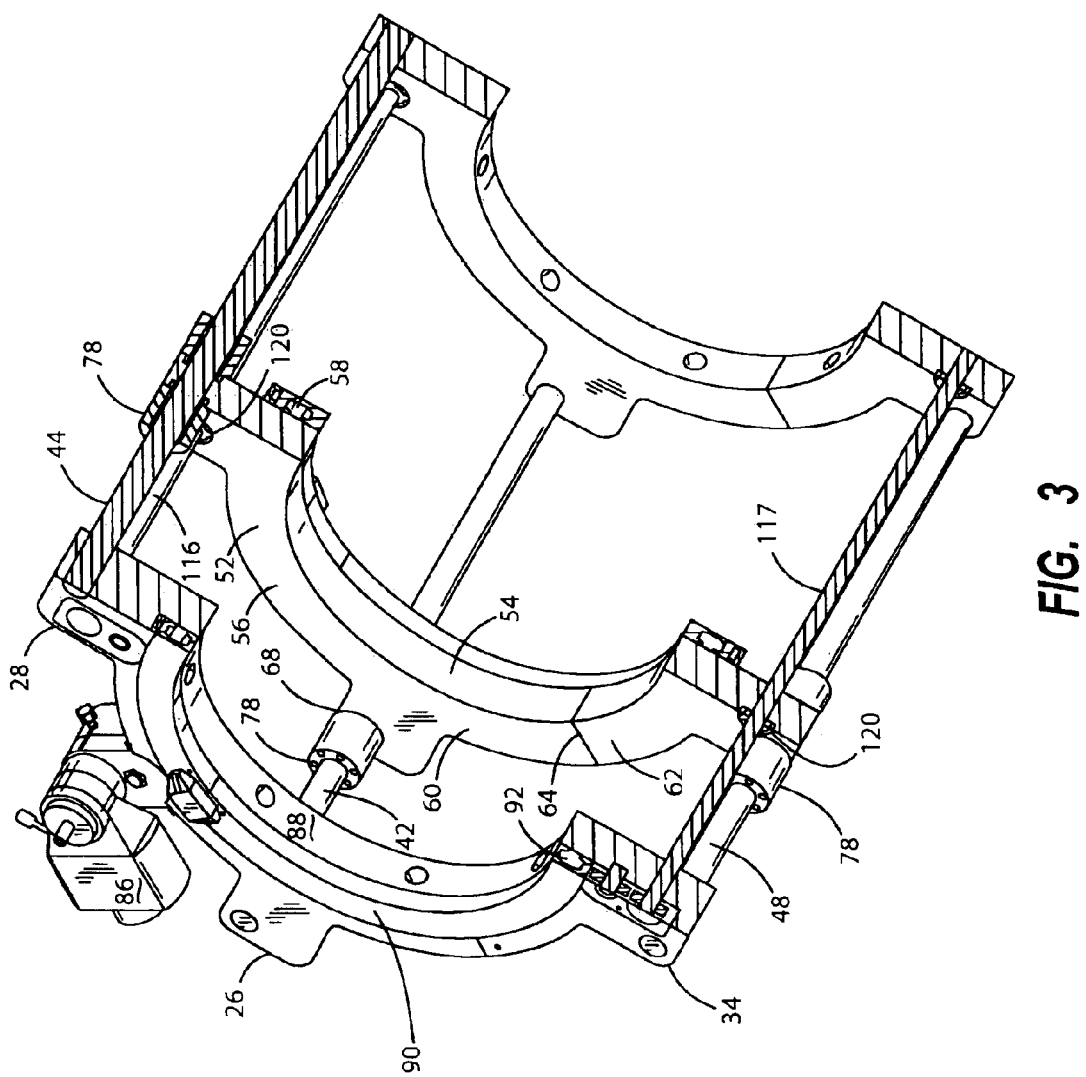
FIG. 3 is a sectional view of the journal turning lathe of FIG. 1.

A clamshell assembly 52 is slidingly supported along guide shafts 42, 44, 48 and 50. This clamshell assembly may be of the type more particularly described in my earlier U.S. Pat. No. 5,549,024, the teachings of which are hereby incorporated by reference as it is set forth in full herein. As explained in the '024 patent, the split frame clamshell assembly 52 includes a stationary ring member 54. Disposed beneath a protective shroud 56 and journaled for rotation on bearings (not shown) which extend in the axial direction from the flat side surface of the stationary ring 54 is a movable gear ring 58 only a small portion of which can be seen through an opening formed in the protective shroud 56 in FIG. 3. This movable gear ring is adapted to be driven by a suitable motor (not shown). The manner which the motor is configured to drive the rotatable gear ring 58 of the clamshell assembly 52 is fully disclosed in the afore-referenced '024 patent. The split ring clamshell comprises two semi-circular segments 60 and 62 that join together along a parting line 64 and may be securely clamped together by swing bolts 65. Integrally formed to the exterior side surface of the stationary clamshell ring 54 are four clamshell guide member 68, 70, 72 and 74. These guide members each include a longitudinal bore, as at 76, for receiving linear bearings 78, the linear bearings surrounding guide shafts 42, 44, 48 and 50. A cutting tool carrier 80 is attached to the movable ring gear 58 and machines the work piece as explained in the '024 patent.

Figure 2:
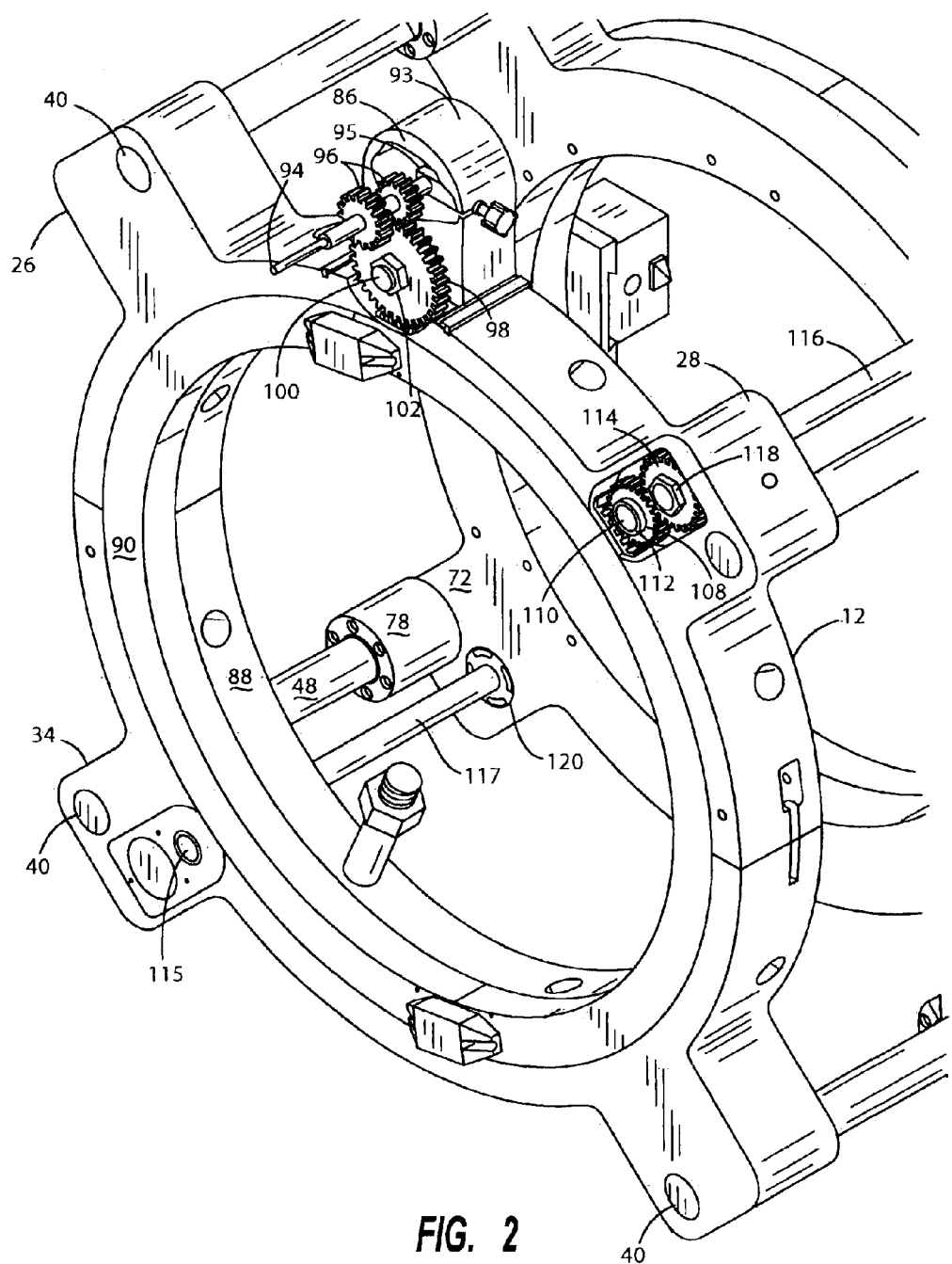
FIG. 2 is a front perspective view showing the drive gear assembly.

As shown in FIG. 2 a drive assembly generally designated by 86 is integrated with the first clamping ring 12. The drive assembly 86 imparts controlled transitional movement of the clamshell assembly 52 along the guide shafts 42, 44, 48 and 50 between the clamping rings 12 and 13. The first clamping ring 12 comprises a stationary ring 88 adapted to be clamped to the cylindrical work piece and a rotatable ring 90 which is journaled for rotation on the stationary ring 88, wherein the rotatable ring 90 has a plurality of gear teeth 92 (FIG. 3) on its peripheral surface. A two-speed servo gear box 93 is mounted on the stationary ring 88. An output shaft 94 extends from a drive motor 95 with a pair of drive gears 96 mounted on the output shaft 94. The gearbox further including a spur gear 98 which is mounted on a spur gear axle 100 and secured on the axle by a hex nut 102. The drive gears 96, and the spur gear 98 form a gear train which engages the gear teeth 92 on the peripheral surface of the rotatable ring 90. The gear train effects a speed reduction between the drive motor speed and the speed at which the rotatable ring is driven. The gear teeth 92 on the rotatable ring 90 engage a pinion gear 108. The pinion gear is mounted on a pinion gear axle 110 which are embedded in ring guides 28 and 34. The bushing 112 is pressed in the drive gear cover (not shown), which holds the gear 108 and shaft 110 in place.

The teeth of pinion gear 108 engage a pair of feed screw drive gears 114 and 115 which are each mounted in ring guides 28 and 34. Two threaded feed screws 116 and 117 are each operatively coupled to the feed screw drive gears 114 and 115 which is held onto the threaded feed screws 116 and 117 by a feed screw drive gear nut 118. The threaded feed screws 116 and 117 are each journaled for rotation at opposite ends in the first clamping ring 12 and the second clamping ring 13.

Disposed on the clamshell assembly 52 and surrounding the feed screw 116 and 117 are feed nuts 120. The feed nuts 120 engage the clamshell drive assembly 52 and rotation of the feed screws will translate the clamshell drive assembly 52 along the guide shafts 42, 44, 48 and 50 between the clamping rings 12 and 13.

Once the clamshell assembly 52 has completed a pass down the workpiece during its cutting stroke at a low speed, it is returned to the starting position by first pressing a "reverse" switch on the servo motor 95 and shifting the two speed gear box 93 to its "fast" state by moving the larger diameter spur gear 116 into engagement with the spur gear 98 for a quick return of the clamshell assembly 52.

This invention has been described herein in considerable detail in order to comply with the Patent Statutes and to provide those skilled in the art with the information needed to apply the novel principles and to construct and use such specialized components as required. However, it is to be understood that the invention can be carried out by specifically different equipment and devices, and the various modifications, both as to the equipment and the operating procedures, can be accomplished without departing from the scope of the invention itself.

What is claimed is:

1. A journal turning lathe for machining cylindrical work pieces comprising:
   (a) first and second clamping rings that are held in concentric alignment at spaced apart positions by a plurality of circumferentially spaced guide shafts, the first and second clamping rings adapted to surround and clamp to the cylindrical work piece;
   (b) a clamshell assembly slidingly supported on the plurality of guide shafts; and
   (c) a drive assembly for imparting controlled translational movement of the clamshell assembly along the plurality of guide shafts between the first and second clamping rings, the drive assembly including at least two circumferentially spaced lead screws journaled for rotation at opposite ends thereof in the first and second clamping rings, each lead screw having a traveling nut thereon operatively engaging the clamshell assembly at diametrically disposed locations, said drive assembly further including a drive motor operatively coupled to simultaneously rotate the at least two lead screws in unison whereby balanced forces are applied to the clamshell assembly at said diametrically disposed locations.

2. The journal turning lathe as in claim 1 wherein the first clamping ring comprises a stationary ring adapted to be clamped to the cylindrical work piece and a rotatable ring journaled for rotation on the stationary ring, the rotatable ring have gear teeth on the peripheral surface thereof.

3. The journal turning lathe as in claim 2 wherein said drive motor includes a spur gear on an output shaft thereof, the drive motor being affixed to the stationary ring with the spur gear forming part of a gear train that engages the gear teeth on the peripheral surface on the rotatable ring.

4. The journal turning lathe as in claim 2 wherein said drive assembly includes a gear box having a plurality of drive gears mounted on an output shaft of said gear box and which are selectively coupled to a spur gear, said drive assembly being affixed to the stationary ring with the drive gears and the spur gear forming a part of a gear train that engages the gear teeth on the peripheral surface of the rotatable ring.

5. The journal turning lathe as in claim 3 wherein the gear train affects a speed reduction between the drive motor's speed and the speed at which said rotatable ring is driven.

6. The journal turning lathe as in claim 4 wherein the gear train effects a speed reduction between the drive motor's speed and the speed at which said rotatable ring is driven.

7. The journal turning lathe as in claim 2 and further including a spur gear on said at least two lead screws that each operatively engage the gear teeth on the peripheral surface on the rotatable ring.

8. The journal turning lathe as in claim 2 and further including:
   (a) at least two pinion gears each operatively engaging the gear teeth on the peripheral surface of the rotatable ring; and b) a spur gear coupled to the at least two lead screws wherein said spur gears each engage the gear teeth on the pinion gears.

9. The journal turning lathe as in claim 3 and further including a spur gear on at least two lead screws that each engage the gear teeth on the peripheral surface of the rotatable ring.

10. The journal turning lathe as in claim 5 and further including a spur gear on the at least two lead screws that each engage the gear teeth on the peripheral surface of the rotatable ring.

11. The journal turning lathe as in claim 1 wherein the clamshell assembly comprises a non-rotatable ring and a rotatable ring, with the traveling nut engaging the non-rotatable ring and the rotatable ring supporting a cutting tool carrier thereon.

12. The journal turning lathe as in claim 11 wherein the rotatable ring includes gear teeth on a peripheral surface thereon and the non-rotatable ring supports a second drive motor having a gear on the output shaft of the second drive motor for operatively engaging the gear teeth on the peripheral surface of the rotatable ring.

13. The journal turning lathe as in claim 11 wherein the cutting tool carrier includes a slide mechanism for carrying a cutting tool and imparting controlled radial displacement of said cutting tool.

* * * * *